(12) United States Patent
Fujita et al.

(10) Patent No.: US 7,025,423 B2
(45) Date of Patent: Apr. 11, 2006

(54) SEAT STRUCTURE

(75) Inventors: Etsunori Fujita, Hiroshima (JP);
Kazuyoshi Chizuka, Hiroshima (JP);
Shusuke Takahashi, Hiroshima (JP)

(73) Assignee: Delta Tooling Co., Ltd., Hiroshima (JP)

( * ) Notice: Subject to any disclaimer, the term of this patent is extended or adjusted under 35 U.S.C. 154(b) by 42 days.

(21) Appl. No.: 10/493,672

(22) PCT Filed: Jul. 17, 2003

(86) PCT No.: PCT/JP03/09078

§ 371 (c)(1),
(2), (4) Date: Apr. 26, 2004

(87) PCT Pub. No.: WO2004/006721

PCT Pub. Date: Jan. 22, 2004

(65) Prior Publication Data

US 2004/0256903 A1    Dec. 23, 2004

(30) Foreign Application Priority Data

Jul. 17, 2002    (JP) .............................. 2002-208420

(51) Int. Cl.
*A47C 7/02* (2006.01)
(52) U.S. Cl. .............................. 297/452.38; 297/452.58
(58) Field of Classification Search .......... 297/452.38, 297/452.49, 452.48, 452.56, 452.58, 452.59, 297/218.1, 218.2, 218.3, 452.52, 452.6
See application file for complete search history.

(56) References Cited

U.S. PATENT DOCUMENTS

| 4,834,451 | A | * | 5/1989 | Meunier et al. | ......... 297/218.2 |
| 4,883,320 | A | * | 11/1989 | Izumida et al. | ........ 297/452.56 |
| 4,973,105 | A | * | 11/1990 | Itou | ...................... 297/344.12 |
| 2004/0130201 | A1 | * | 7/2004 | Kawasaki et al. | ..... 297/452.56 |

FOREIGN PATENT DOCUMENTS

| JP | 2002-199955 | 7/2002 |
| TW | 435129 | 1/2000 |

* cited by examiner

Primary Examiner—Milton Nelson, Jr.
(74) Attorney, Agent, or Firm—Wenderoth, Lind & Ponack, L.L.P.

(57) ABSTRACT

A plurality of trim retainers 6, 50 are joined at opposite ends thereof to a seat back frame 4a. A first tension member 16 is connected at one end thereof to an outer edge of a body-contact portion of a cushioning material 8 and to an outer edge of a trim material 14. A second tension member 20 is connected at one end thereof to a portion of the body-contact portion of the cushioning material 8 and to an inner edge of the trim material 14. The plurality of trim retainers include a first trim retainer 50 for retaining the other end of the first tension member 16 and a second trim retainer 6 having a retaining portion for retaining the other end of the second tension member 20, with the retaining portion of the second trim retainer extending generally parallel to a cylindrical frame 4a.

5 Claims, 6 Drawing Sheets

NON-LOAD CONDITION

NON-LOAD CONDITION

Fig. 2B

SITTING CONDITION

Fig. 3A

NON-LOAD CONDITION

Fig. 3B

SITTING CONDITION

Fig. 4A

NON-LOAD CONDITION

Fig. 4B

SITTING CONDITION

Fig. 5

SITTING CONDITION

Fig. 6A

NON-LOAD CONDITION

Fig. 6B

SITTING CONDITION

SEAT STRUCTURE

TECHNICAL FIELD

The present invention relates to a seat structure in which a frame is fitted with a cushioning material.

BACKGROUND ART

Conventional automobile seats generally include spring members attached to a seat frame, a pad material such as a foamed material or cotton placed thereon, and a skin such as a vinyl leather, woven cloth, or leather covered thereon.

On the other hand, seats other than the automobile seats generally include a pad material placed on the frame and covered with a skin, and some of them also include spring members for enhancing the cushioning characteristics.

However, such seats are mostly thick, heavy and costly.

In view of the above, a variety of lightweight, inexpensive and thin seats have been recently proposed, and the inventors of this application have developed thin seats having a lightweight net of a three-dimensional structure that is provided with desired characteristics (spring characteristics, damping characteristics and the like) sufficient for a cushioning material.

A three-dimensional net (hereinafter referred to as 3-D net) employed in such thin seats is formed of a three-dimensional knit fabric, which has a ground fabric formed into, for example, a knit texture or a honeycomb-shaped (hexagonal) mesh. The 3-D net has a three-layered solid truss structure in which an upper mesh layer and a lower mesh layer are connected to each other by a pile layer having a large number of piles. Each yarn of the upper mesh layer and the lower mesh layer is formed by twisting a number of fine threads, while each of the piles is formed of a single thick string to provide the three-dimensional knit fabric with rigidity.

Figure 6A:
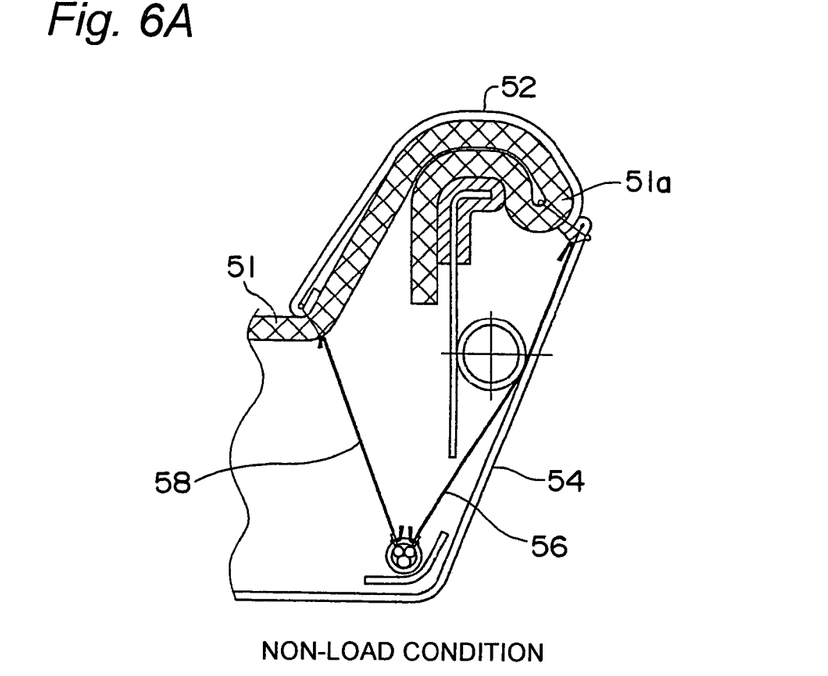
FIG. 6A is a cross-sectional view of a conventional seat structure in a non-load condition.
Figure 6B:
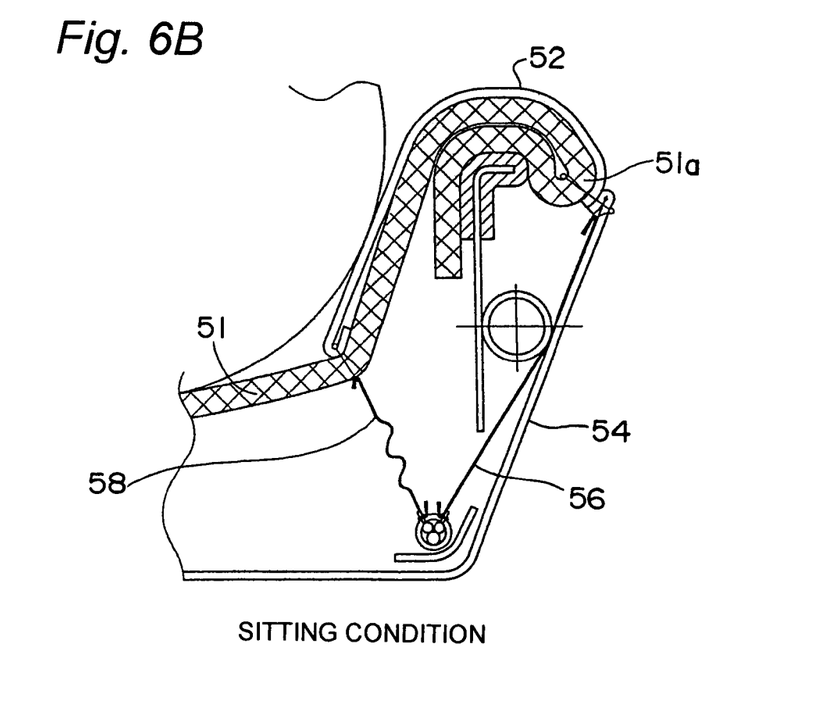
FIG. 6B is a cross-sectional view of the conventional seat structure in a sitting condition.

FIGS. 6A and 6B depict a horizontal cross section of a side portion of a conventional seat back cushion having a 3-D net, and particularly depict a lower portion of the seat back cushion that is brought into contact with a lumbar region of the human body.

As shown in FIGS. 6A and 6B, a side portion of a cushioning material 51 is covered with a trim material 52 such as, for example, a cloth to improve the appearance thereof, and an outer edge of the trim material 52 together with a folded portion 51a of the cushioning material 51 is sewn to an outer edge of a trim material 54 and to one end of a tension member 56 to receive a rearward tension, while an inner edge of the trim material 52 together with a portion of the cushioning material 51 is sewn to one end of a tension member 58 to receive a rearward tension.

In the above-described construction, the tension member 58 is so designed as to have a tendency to loosen and, hence, it is likely that the appearance may be lost. As shown in FIG. 6B depicting a sitting condition, the cushioning material 51 sinks, the tension member 58 receives no tension, and the load of the human body is supported by a tension of the 3-D net.

Accordingly, the tension applied to the trim material 52 is not always constant and there is a good chance that wrinkles or slack may occur in the trim material 52.

The present invention has been developed to overcome the above-described disadvantages.

It is accordingly an objective of the present invention to provide a seat structure having an improved appearance by making the tension applied to a trim material formed thereon substantially constant so that neither wrinkles nor slack may occur in the trim material regardless of whether the seat is loaded or not.

DISCLOSURE OF THE INVENTION

In accomplishing the above objective, the seat structure according to the present invention has a seat cushion frame on which a seat cushion is mounted and a seat back frame on which a seat back is mounted, and is characterized by a plurality of trim retainers joined at opposite ends thereof to the seat back frame, a cushioning material stretched over the seat back frame, a trim material covered on a side portion of the cushioning material, a first tension member connected at one end thereof to an outer edge of a body-contact portion of the cushioning material, which portion of the cushioning material is intended to contact with a lumbar region of a seat occupant, and to an outer edge of the trim material, and a second tension member connected at one end thereof to a portion of the body-contact portion of the cushioning material and to an inner edge of the trim material. The plurality of trim retainers include a first trim retainer for retaining the other end of the first tension member and a second trim retainer having a retaining portion for retaining the other end of the second tension member, the retaining portion of the second trim retainer extending generally parallel to the seat back frame.

Alternatively, a seat structure having a seat cushion frame on which a seat cushion is mounted and a seat back frame on which a seat back is mounted is characterized by a plurality of trim retainers joined at opposite ends thereof to the seat back frame, a cushioning material stretched over the seat back frame, a trim material covered on a side portion of the cushioning material, a first tension member connected at one end thereof to an outer edge of a body-contact portion of the cushioning material and to an outer edge of the trim material, an annular member connected to a portion of the body-contact portion of the cushioning material and to an inner edge of the trim material, and a second tension member extending through the annular member. The plurality of trim retainers include a first trim retainer for retaining the other end of the first tension member and one end of the second tension member and a second trim retainer having a retaining portion for retaining the other end of the second tension member, the retaining portion of the second trim retainer extending generally parallel to the seat back frame.

Furthermore, the second trim retainer is characterized by being positioned frontwards of the first trim retainer and approximately on an extension of a body-contact surface of the cushioning material.

The second trim retainer is also characterized by being positioned rearwards of the body-contact surface of the cushioning material in a non-load condition and is positioned frontwards of a central portion of the contact surface of the cushioning material with the lumbar region of the seat occupant in a sitting condition.

DETAILED DESCRIPTION OF THE PREFERRED EMBODIMENTS

Figure 1:
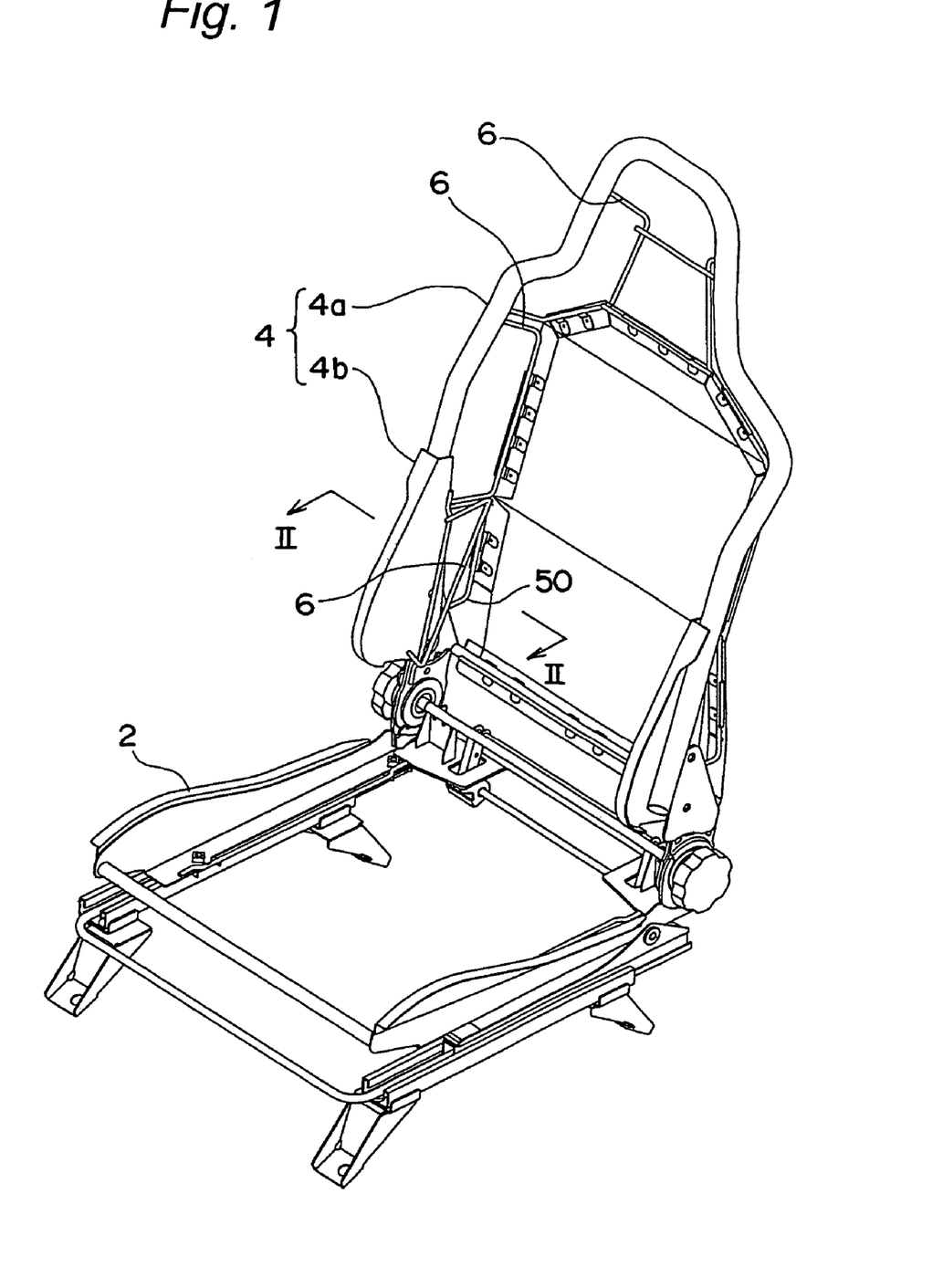
FIG. 1 is a perspective view of a frame structure provided in a seat structure according to the present invention.

The embodiments of the present invention are explained hereinafter with reference to the drawings;

FIG. 1 depicts a frame structure according to the present invention, particularly depicting a frame structure of an automobile seat.

As shown in FIG. 1, the frame structure according to the present invention includes a seat cushion frame 2 on which a seat cushion is mounted, a seat back frame 4, hingedly connected to the seat cushion frame 2, on which a seat back is mounted, and a plurality of trim retainers 6 secured to the seat back frame 4. The seat back frame 4 includes a generally cylindrical frame 4a (for example, a pipe frame) forming a framework of the seat back frame 4 and generally planar side frames 4b joined to opposite end portions (lower end portions) of the generally cylindrical frame 4a and each having a front end portion bent 90°. Each trim retainer 6 is made, for example, by bending a wire, and opposite ends thereof are joined to the seat back frame 4.

Each trim retainer 6 has a retaining portion formed at an intermediate portion thereof so as to extend substantially parallel to the seat back frame 4 (spaced substantially equally from the seat back frame). One end of a tension member engages with the retaining portion to retain a trim material together with a cushioning material on the seat back frame 4.

It is to be noted that although the frame structure of FIG. 1 has two trim retainers 6, 50 at a level corresponding to a lumbar region of a seat occupant on each side thereof, the trim retainer 50 is also mounted in conventional seat structures. The trim retainer 6 positioned in front of the trim retainer 50 is newly fitted approximately on an extension of a central portion (a portion not covered with a trim material 14) of a cushioning material 8 made of a 3-D net.

Figure 2A:
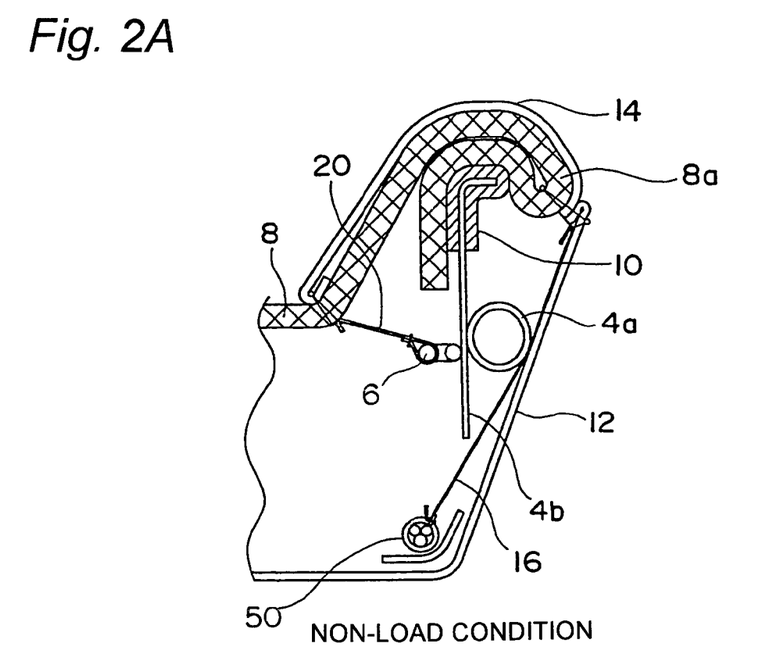
FIG. 2A is a cross-sectional view taken along line II—II in FIG. 1, particularly depicting a non-load condition.
Figure 2B:
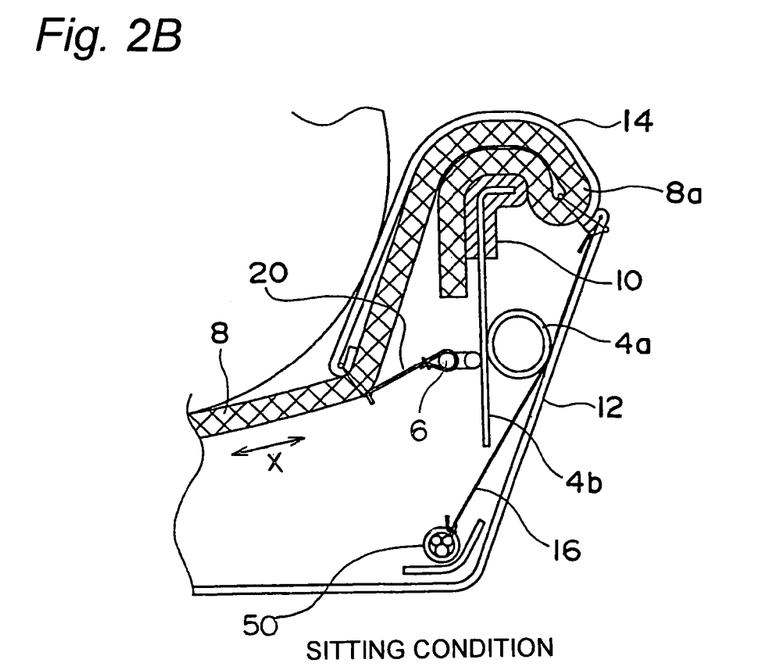
FIG. 2B is a cross-sectional view taken along line II—II in FIG. 1, particularly depicting a sitting condition.

FIGS. 2A and 2B depict a condition in which the cushioning material 8 made of the 3-D net is fitted to the frame structure shown in FIG. 1. FIG. 2A depicts a non-load condition, while FIG. 2B depicts a sitting (loaded) condition.

As shown in FIG. 1 and FIGS. 2A and 2B, an outer edge of a lower portion of the cushioning material 8 is folded back 180° and held in contact with a cushioning material 10 covered on a front end portion of the side frame 4b. A folded portion 8a of the cushioning material 8 is sewn to an outer edge of a trim material 12 such as, for example, a cloth or the like. A side portion of the cushioning material 8 is covered with a trim material 14 such as, for example, a cloth or the like. An outer edge of the trim material 14 together with the folded portion 8a of the cushioning material 8 are sewn to an outer edge of the trim material 12 and to one end of a first tension member 16, the other end of which engages with the trim retainer 50. An inner edge of the trim material 14 together with a portion of the cushioning material 8 are sewn to one end of a second tension member 20, the other end of which engages with the trim retainer 6 joined to the generally cylindrical frame 4a.

In the above-described construction, the cushioning material 8 is retained by the second tension member 20 at an initial tension that is low but can maintain the shape of the cushioning material 8. That is, the second tension member 20 acts, in the non-load condition, as an appearance-maintaining tension member for applying a tension to the cushioning material 8 and the trim material 14 to suppress wrinkles or slack, and also acts, in the sitting (loaded) condition, as a lumbar-supporting or posture-maintaining tension member for applying a tension to the cushioning material 8 to assuredly support the seat occupant.

An outer edge of an upper portion and that of a vertical intermediate portion of the cushioning material 8 are also folded back 180° and held in contact with the generally cylindrical frame 4a, and respective folded portions are sewn to the outer edge of the trim material 12, as is the case with the lower folded portion 8a. The other construction of the upper and vertical intermediate portions of the cushioning material 8 is substantially the same as that of the lower portion, and the cushioning material 8 is stretched over the seat back frame 4 at a substantially constant tension.

In the above-described frame structure, the outline of the seat back frame 4 and a line on which the retaining portion of each trim retainer 6 extends are substantially parallel to each other, and each tension member has a constant width. Accordingly, regardless of whether a non-load or sitting (loaded) condition exists, the trim material is applied with a constant tension by the tension member without being partly loosened, making it possible to prevent wrinkles or slack from occurring in the trim material and improve the appearance.

As shown in FIGS. 2A and 2B, the cushioning material 8 is depressed rearwards in the sitting condition compared with the non-load condition and, hence, the spring constant of the cushioning material 8 increases, creating a supporting capability. Further, because the second tension member 20 applies, in the sitting condition, a tension to a portion of the cushioning material 8 with which the lumbar region of a seat occupant is brought into contact (a strong tension is created in the direction of an arrow X), such a portion comes to substitute for a lumbar support.

Figure 3A:
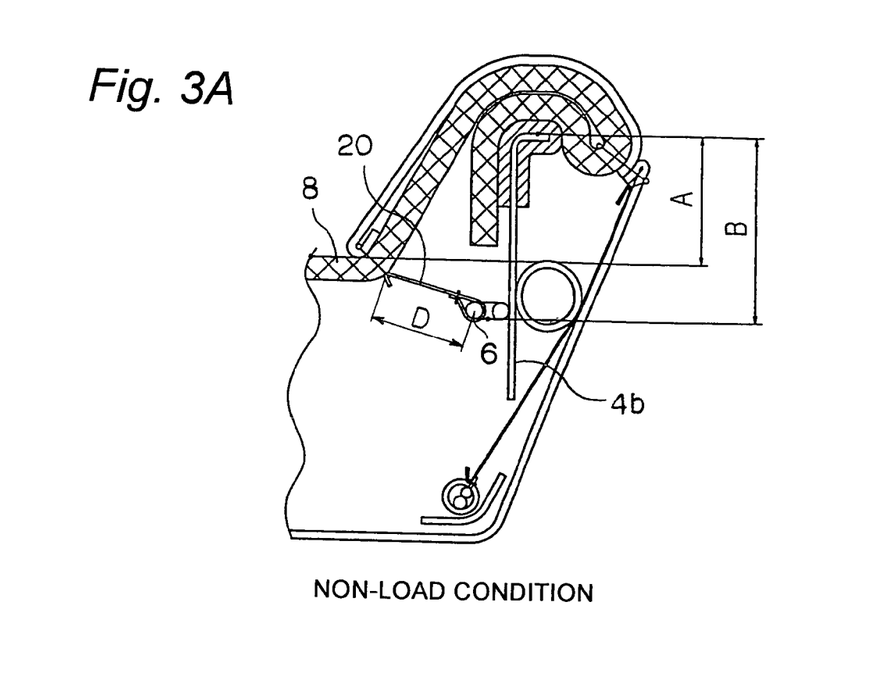
FIG. 3A is a cross-sectional view similar to FIG. 2A, but depicting the position where a trim retainer for retaining a tension member is fitted.
Figure 3B:
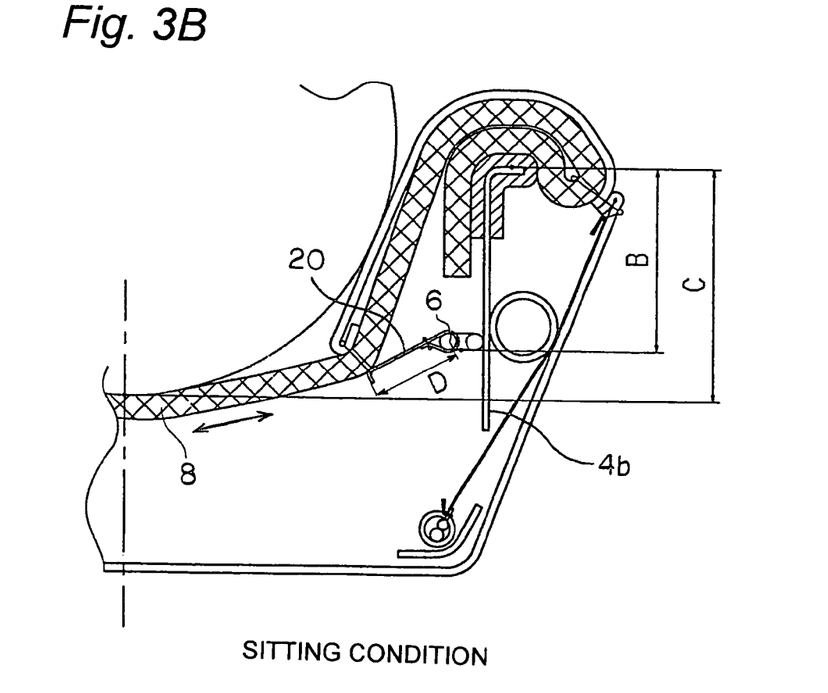
FIG. 3B is a cross-sectional view similar to FIG. 2B, but depicting the position where the trim retainer for retaining the tension member is fitted.

FIGS. 3A and 3B depict the location where the trim retainer 6 is fitted. In the non-load condition as shown in FIG. 3A, the trim retainer 6 is positioned rearwards of a body-contact surface of the cushioning material 8 (i.e. the surface of the cushioning material intended to contact with the human body, and preferably, the lumbar region, while in the sitting condition as shown in FIG. 3B, the trim retainer 6 is positioned frontwards of a central portion of the body-contact surface of the cushioning material.

More specifically, letting A be the distance between the body-contact surface of the cushioning material 8 and a front end portion of the side frame 4b in the non-load condition, B be the distance between the front end portion of the side frame 4b and the trim retainer 6, and C be the distance between the body-contact surface of the cushioning material 8 and the front end portion of the side frame 4b in the sitting condition, the aforementioned effect can be obtained by establishing a relationship of C>B>A. Accordingly, if a material similar to a solid member is employed as the second tension member 20, the length D as shown in FIGS. 3A and 3B is constant and, hence, the circumferential length of the cushioning material 8 differs in the non-load condition and in the sitting condition. Because of this, the cushioning material 8 becomes elongated and creates a tension (in the direction of an arrow in FIG. 3B) in the sitting condition. Accordingly, when a load of the human body is applied to the cushioning material 8, a reaction force increases to increase a support pressure for the lumbar region so that the cushioning material 8 may act to substitute for the lumbar support.

Figure 4A:
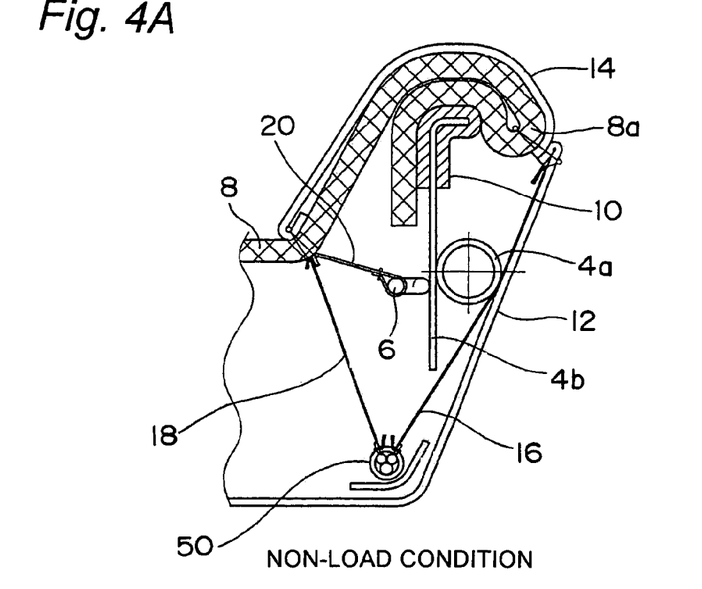
FIG. 4A is a cross-sectional view similar to FIG. 2A, but depicting another tension member added thereto.
Figure 4B:
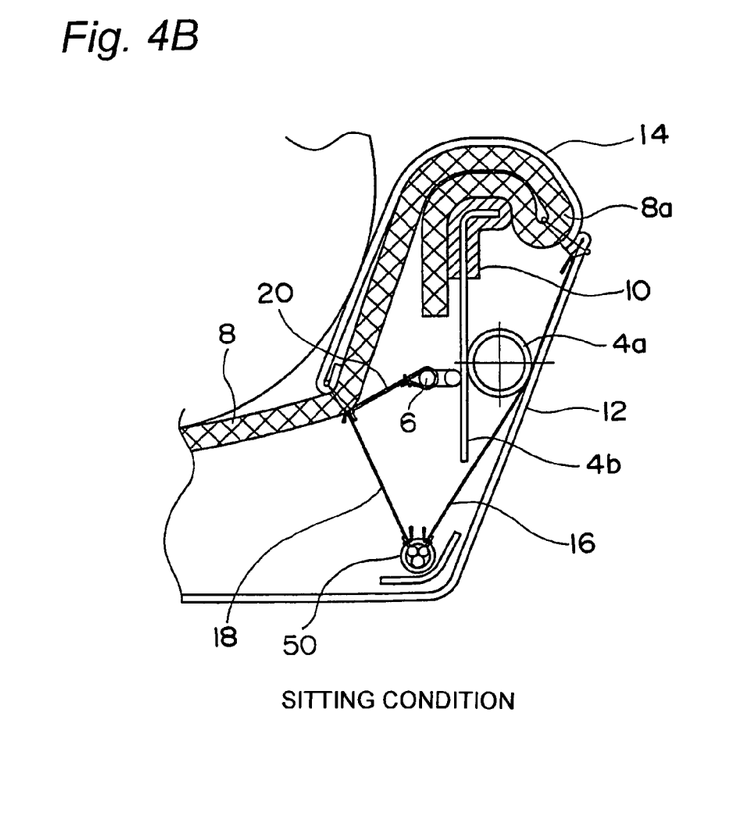
FIG. 4B is a cross-sectional view similar to FIG. 2B, but depicting another tension member added thereto.

As shown in FIGS. 4A and 4B, an elastic third tension member 18 may be fitted in addition to the construction as shown in FIGS. 3A and 3B. The third tension member 18 is sewn at one end thereof to an inner edge of the trim material 14 and to a portion of the cushioning material 8 and is connected at the other end thereof to the trim retainer 50. In this case, the second tension member 20 and the third tension member 18 enable fine adjustments in shape and tension of the cushioning material 8.

Figure 5:
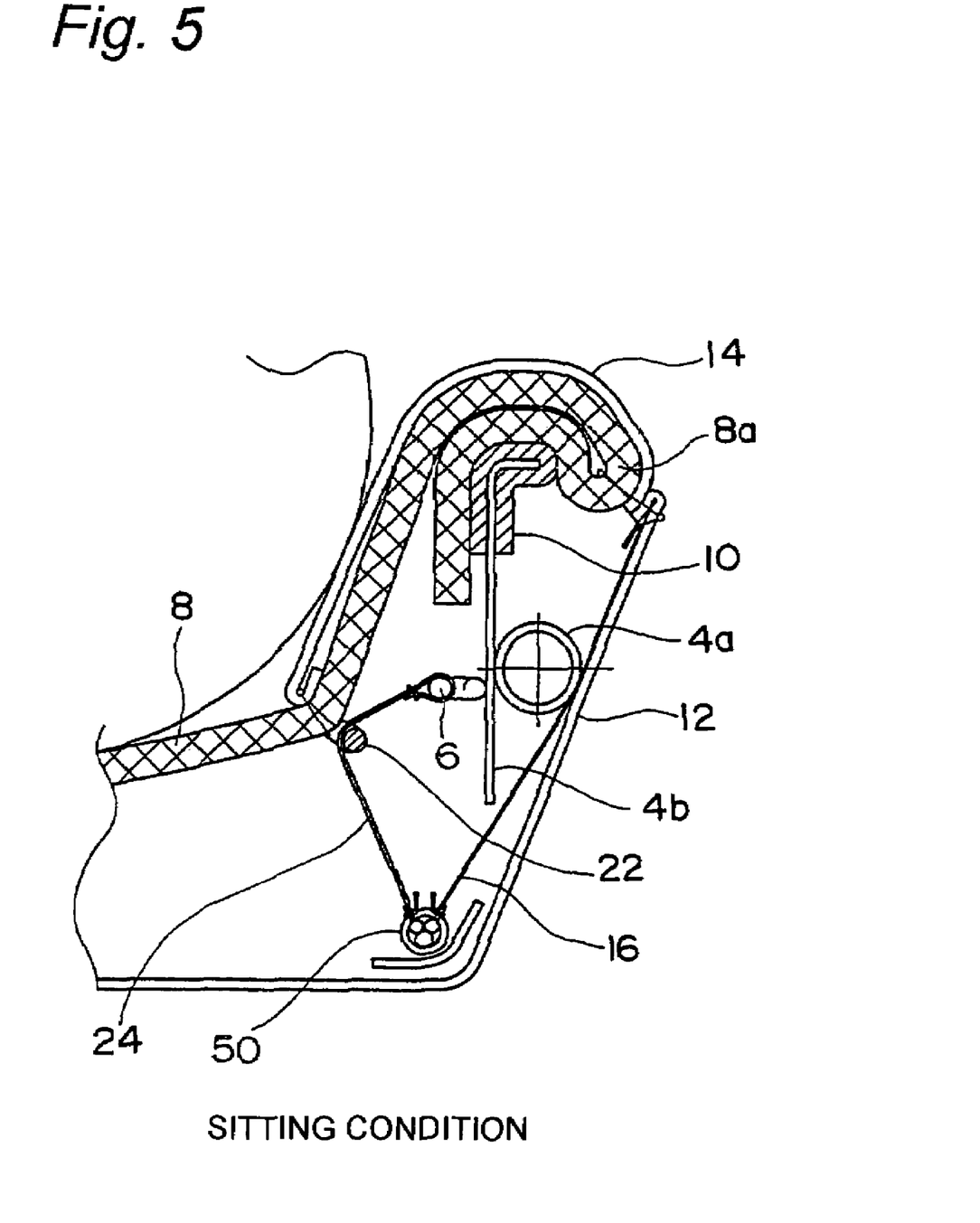
FIG. 5 is a cross-sectional view taken along line II—II in FIG. 1, particularly depicting a modification of the seat structure according to the present invention in a sitting condition.

As shown In FIG. 5, a single tension member 24 extending through an annular member 22 may be connected at opposite ends thereof to the trim retainer 6 and the trim retainer 50, respectively, with the annular member 22 sewn to the inner edge of the trim material 14 and to a portion of the cushioning material 8. In this case, because the tension member 24 can freely slide across the annular member 22, a predetermined tension can be applied to the cushioning material 8 regardless of the non-load or sitting condition using the slack-free single tension member 24.

Moreover, the generally cylindrical frame 4a or each trim retainer 6 is elastic, because it is fixed at only opposite ends thereof and has no support members at the other portions thereof. If a large load is inputted to an automobile seat employing the generally cylindrical frame 4a or the trim retainer 6 due to a collision (particularly a rear-end collision), the generally cylindrical frame 4a or the trim retainer 6 deforms, thereby loosening the cushioning material 8. Accordingly, the damping force increases and the ability to absorb collision energy increases, enhancing the safety of the seat.

Although in the above-described embodiment a 3-D net is employed for the cushioning material, any other cushioning member can be similarly employed.

The present invention having the above-described construction offers the following effects.

According to the present invention, a plurality of trim retainers joined at opposite ends thereof to a seat back frame include a first trim retainer for retaining one end of a first tension member connected at the other end thereof to an outer edge of a body-contact portion of a cushioning material and to an outer edge of a trim material covered on a side portion of the cushioning material, and also include a second trim retainer having a retaining portion for retaining one end of a second tension member connected at the other end thereof to a portion of the contact portion of the cushioning material with the lumbar region of the seat occupant and to an inner edge of the trim material. Because the retaining portion of the second trim retainer extends generally parallel to the seat back frame, a substantially constant tension is always applied to the trim material, making it possible to provide a seat structure having an improved appearance and free from wrinkles or slack in the trim material regardless of whether the seat is loaded or not.

Alternatively, it may be so designed that the second tension member is connected at one end thereof to the first trim retainer and at the other end to the second trim retainer, while extending through an annular member connected to a portion of the body-contact portion of the cushioning material and to an inner edge of the trim material. By so doing, the similar effects can be obtained.

Because the second trim retainer is positioned frontwards of the first trim retainer and approximately on an extension of a body-contact surface of the cushioning material, a tension is applied to the cushioning material by the second tension member in the sitting condition and, hence, such a portion substitutes for a lumbar support.

In addition, because the second trim retainer is positioned rearwards of the body-contact surface of the cushioning material in the non-load condition and is also positioned frontwards of a central portion of the body-contact surface of the cushioning material in the sitting condition, a predetermined tension is applied to the cushioning material by the second tension member in the sitting condition.

The invention claimed is:

1. A seat structure having a seat cushion frame on which a seat cushion is mounted and a seat back frame on which a seat back is mounted, said seat structure comprising:
    a plurality of trim retainers joined at opposite ends thereof to the seat back frame;
    a cushioning material stretched over the seat back frame;
    a trim material covered on a side portion of the cushioning material;
    a first tension member connected at one end thereof to an outer edge of a body-contact portion of the cushioning material and to an outer edge of the trim material;
    a second tension member connected at one end thereof to a portion of the body-contact portion of the cushioning material and to an inner edge of the trim material; and
    the plurality of trim retainers comprising:
        a first trim retainer retaining the other end of the first tension member; and
        a second trim retainer having a retaining portion retaining the other end of the second tension member, the retaining portion of the second trim retainer extending generally parallel to the seat back frame.

2. The seat structure according to claim 1, wherein the second trim retainer is positioned frontwards of the first trim retainer and substantially on an extension of a body-contact surface of the cushioning material.

3. The seat structure according to claim 2, wherein the second trim retainer is positioned rearwards of the body-contact surface of the cushioning material in a non-load condition and is positioned frontwards of a central portion of the body-contact surface in a loaded condition.

4. A seat structure having a seat cushion frame on which a seat cushion is mounted and a seat back frame on which a seat back is mounted, said seat structure comprising:
    a plurality of trim retainers joined at opposite ends thereof to the seat back frame;
    a cushioning material stretched over the seat back frame;
    a trim material covered on a side portion of the cushioning material;
    a first tension member connected at one end thereof to an outer edge of a body-contact portion of the cushioning material and to an outer edge of the trim material;
    an annular member connected to a portion of the body-contact portion of the cushioning material and to an inner edge of the trim material;

a second tension member extending through the annular member; and the plurality of trim retainers comprising:

a first trim retainer retaining the other end of the first tension member and one end of the second tension member; and a second trim retainer having a retaining portion retaining the other end of the second tension member, the retaining portion of the second trim retainer extending generally parallel to the seat back frame.

5. The seat structure according to claim 4, wherein the second trim retainer is positioned frontwards of the first trim retainer and substantially on an extension of a body-contact surface of the cushioning material.

* * * * *